United States Patent [19]
Whiting

[11] Patent Number: 5,147,161
[45] Date of Patent: Sep. 15, 1992

[54] RETROFIT COOLANT SUPPLY SYSTEM FOR A MACHINE TOOL

[76] Inventor: Robert L. Whiting, 14440 Boucher, Linden, Mich. 48451

[21] Appl. No.: 784,165

[22] Filed: Oct. 28, 1991

[51] Int. Cl.⁵ .............................................. B23B 47/00
[52] U.S. Cl. ...................................... 408/61; 409/136
[58] Field of Search .............................. 408/56, 61, 60; 409/135, 136; 29/DIG. 50, DIG. 63, DIG. 76, DIG. 79, DIG. 101

[56] References Cited
U.S. PATENT DOCUMENTS 2,358,247  9/1944  Palotsee ..................... 29/DIG. 101
2,369,828  2/1945  Humphreys ........................... 408/61
2,482,729  9/1949  Dzus ..................................... 409/136
2,760,387  8/1956  Wade ..................................... 408/61

Primary Examiner—Daniel W. Howell
Attorney, Agent, or Firm—John R. Benefiel

[57] ABSTRACT

A retrofit coolant system for a small machine tools including a drip tray configured to rest on the forward projecting base portion of the machine and having a sump cavity formed in one of a pair of upwardly angled side collector sections included in the drip tray. The sump cavity rests on the adjacent supporting floor surface and has a pump in the cavity, covered with a screen. The drip tray collects coolant drippage and overspray, directing the same into the sump cavity.

3 Claims, 2 Drawing Sheets

RETROFIT COOLANT SUPPLY SYSTEM FOR A MACHINE TOOL

BACKGROUND OF THE INVENTION

This invention concerns a retrofit coolant supply system for small machine tools such as milling machines, drill presses, and the like often not equipped with a built in system for supplying cutting fluid to the machining zone.

It sometimes happens that a particular use of the machine makes it desirable to have the capability of supplying cutting fluid to the machining zone.

A suitable supply arrangement must be effective in collecting the coolant after it has been directed from a nozzle in a jet at the cutting tool and workpiece the coolant cascades down the machine surfaces.

Preferably, any retrofitted system should be simple to install and simply configured to be low in cost.

One such arrangement is shown in U.S. Pat. No. 2,760,387 to Wade, utilizing a pan fixed beneath the base of a machine. This approach requires substantial effort in installation, and does not appear to be configured to be particularly effective in collecting the coolant-cutting fluid for recirculation.

SUMMARY OF THE INVENTION

The present invention comprises a retrofit coolant system including a drip tray of a special configuration easily installed on a small machine tool which is particularly effective in collecting coolant-cutting fluid and will allow recirculation of coolant by a pump installed in the drip tray.

The drip tray configuration includes a generally rectangular main section having a clearance slot formed into the rear side, the slot accommodating a vertical post at front of the machine, enabling the main section of the drip tray to be slid back against the machine column. A pair of upwardly angled collector sections are also included in the drip tray, one on each side of the main section. An upturned border is formed about the entire perimeter of the drip tray, including the perimeter of the slot to confine the collected coolant. The main and collector sections each have an outwardly angled front wall while the collector sections also have flared rear walls, to aid in collections of the coolant and prevent overspray onto the adjacent floor areas.

One of the collector sections is further formed with a sump cavity extending downwardly to floor lever adjacent the machine base, adapted to receive accumulated fluid from each section of the drip tray so that a pump placed in the sump cavity for circulating the cutting fluid to the machining zone. A ledge formed in the drip tray about the sump cavity enables a screen to cover the sump and pumps preventing entry of chips or other debris into the sump cavity.

The drip tray is thus configured to be readily installed atop the machine base without the need for any hoisting or other disturbance of the machine itself.

The collector sections provide effective collection of fluid after being directed into the cutting zone to prevent any escape of the coolant and enable recirculation thereof for reuse in the system.

DETAILED DESCRIPTION

Figure 1:
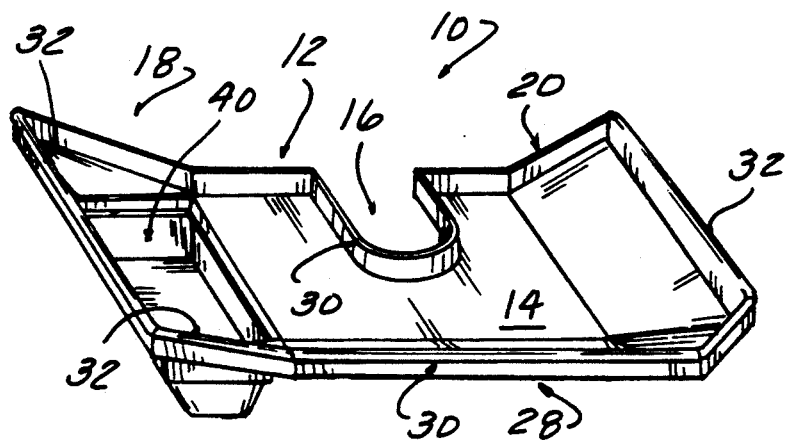
FIG. 1 is a perspective view of the drip tray according to the present invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the Drawings, a specially configured drip tray 10 comprises a part of the retrofit coolant supply system according to the present invention.

The drip tray 10 may be constructed as by vacuum forming, of relatively thin walled plastic, or of formed sheet metal.

A main section 12 is provided, including a flat generally rectangular floor 14, formed with a slot shaped cutout 16 extending in from the rear to approximately the midpoint of the floor 14.

Joined to one side of the main section 12 is an upwardly angled first side collector section 18 (to the right as viewed in FIG. 1), and to the other side, an upwardly angled section side collector section 20 (to the left as viewed in FIG. 1).

An upwardly angled panel 22 extends from the front of the main section 12 which together with upwardly and outwardly angled transition panels 24 and 26 of collector sections 18 and 20 respectively form an outwardly flared front collector section 28.

An upturned border 30 extends entirely about the perimeter of all of the sections 14, 18, 20 and 26 particularly, including the slot cutout 16, to impound liquid coolant collected in the drip pan 12.

A rolled edge 32 is provided at along the border 30 at the front and sides for increased stiffness and ease of handling of the drip pan 12.

Each side collector section 18, 20 includes a respective main panel 34, 36.

The first side section 18 includes an additional rear panel 38 and is provided with a sump cavity 40 formed by vertical walls 42 extending down from the main and rear panels 34, 38 and transition panel 24, closed off with a bottom wall 44.

A ledge is created by steps 46 formed in the vertical walls 42.

Figure 5:
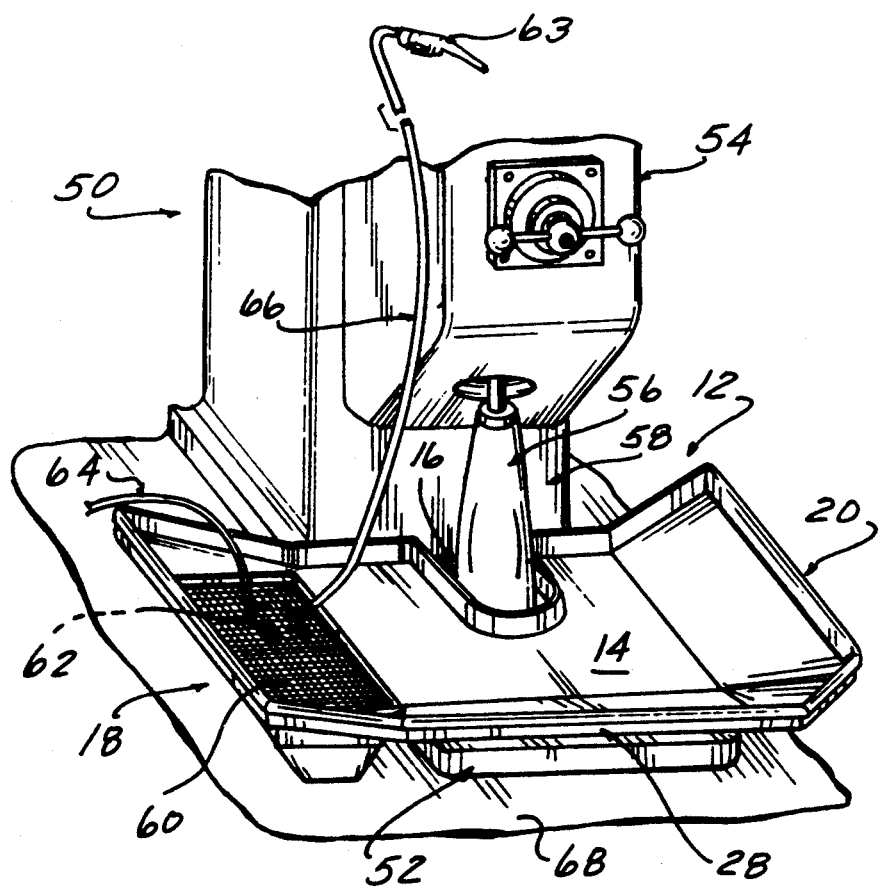
FIG. 5 is a fragmentary perspective view of a machine tool having the drip tray and recirculation pump installed thereon.
Figure 2:
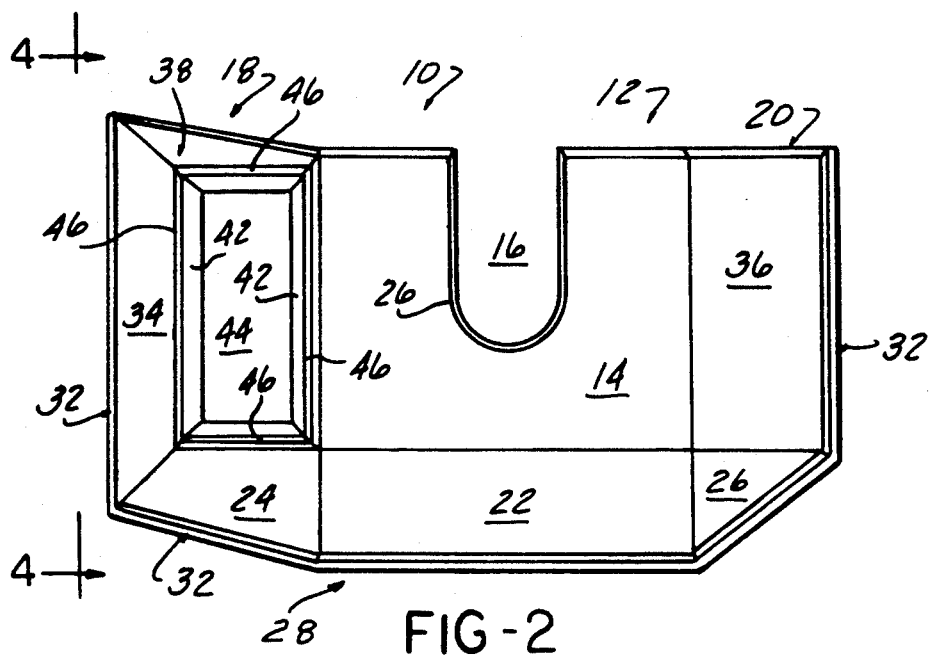
FIG. 2 is a plan view of the drip tray shown in FIG. 1.
Figure 3:
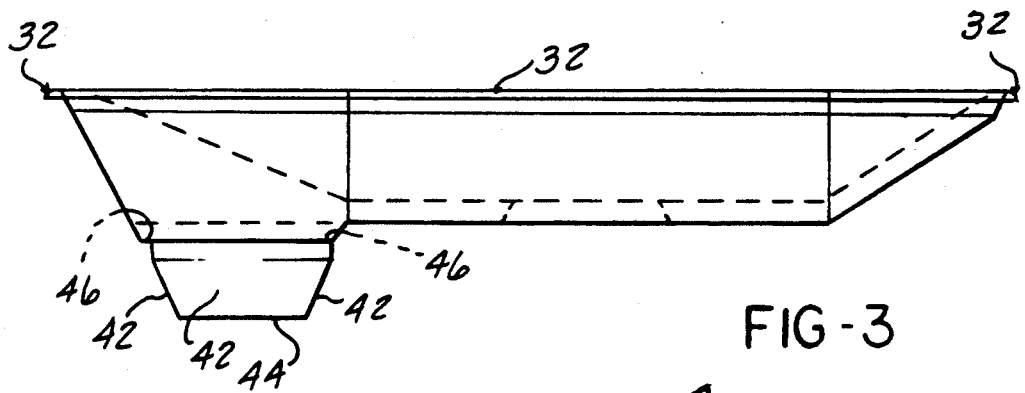
FIG. 3 is a front elevational view of the drip tray shown in FIG. 1.
Figure 4:
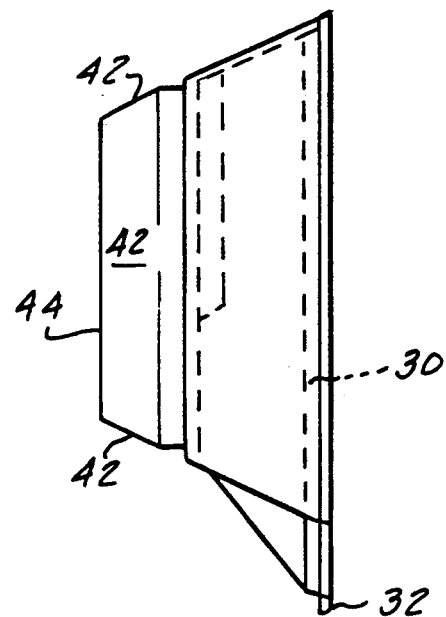
FIG. 4 is a view of the drip tray taken in the direction of the arrows 4—4 in FIG. 3.

The completely installed retrofit coolant supply system is shown installed on a vertical axis milling machine 50 in FIG. 5. The milling machine includes a base having a portion 52 resting on the floor projecting forwardly under a table slide 54, with a vertical post 56.

The drip tray 12 is positioned atop the base portion 52 slid back against a column portion 58 of the machine 50, the slot cut out 16 accommodating the post 56.

The side collector sections 18, 20 extend outwardly to either side of the machine 50 and the front collector section 28 flares out to the front, so that together provide very effective catching of drippage and overspray of coolant directed in a jet into the machining zone (not shown).

A screen 60 is installed atop the ledge formed about the vertical walls 42 defining the sump cavity 40, the screen keeping out chips and other debris.

A circulation pump 62 is disposed in the cavity 40, a power cord 64 plugged into an AC outlet (not shown), and a supply hose 66 extending to a coolant jet 63 of conventional construction located to direct a stream of coolant into the cutting zone.

The bottom wall 44 of the cavity 40 is located so as to rest on the floor surface 68 on which the machine 50 rests so as to provide support and stability of the drip tray 12. The dimensions are thus related to the height of the base portion 52 on which the main section 14 rests.

Thus, the coolant system provides a combined collector and reservoir, collecting the coolant and concentrating the same by gravity into the sump cavity 40 for recirculation by the pump 62.

It will be appreciated that the machine 50 need not be disturbed, and that installation can be accomplished in a few moments.

The components are simple and may be inexpensively manufactured.

I claim:

1. A retrofit coolant circulation system for a machine tool of the type having a forwardly projecting base portion resting on a supporting surface and a vertical post projecting up from said base portion, said system comprising:
    a drip tray having a generally planar main section resting on said base portion, with a slot cutout extending in from a rear side of said main section accommodating said post therein;
    said drip tray further including a first and second upwardly angled side collector sections located on one side of said main section, and a forwardly flared forward collector section extending across said first and second side collector sections and said main section;
    an upturned border extending about the perimeter of said drip tray confining coolant therein;
    a sump cavity formed in one of said side collector sections extending downwardly to said supporting surface;
    a pump disposed in said cavity;
    an outlet hose and nozzle connected to said pump for receiving a jet flow of coolant recirculated from said sump cavity.

2. The system according to claim 1 further including a screen overlying said sump cavity.

3. The system according to claim 1 wherein said upturned border has a rolled edge along at least the forward side thereof.

* * * * *